United States Patent [19]

West et al.

[11] Patent Number: 4,569,834

[45] Date of Patent: Feb. 11, 1986

[54] CARBON BLACK PELLETS HAVING ENHANCED DISPERSION PROPERTIES

[75] Inventors: Jesse R. West; Lance M. Garton, both of Houston, Tex.

[73] Assignee: Continental Carbon Company, Houston, Tex.

[21] Appl. No.: 613,838

[22] Filed: May 24, 1984

[51] Int. Cl.[4] .......................... C09C 1/56; D04H 1/16; B29C 62/00; C01B 31/14
[52] U.S. Cl. .................................... 423/460; 264/113; 264/117; 23/314
[58] Field of Search ............... 423/445, 449, 450, 460, 423/461, 455, 456, 457; 23/314

[56] References Cited

U.S. PATENT DOCUMENTS

| | | | |
|---|---|---|---|
| 3,498,814 | 3/1970 | Voet et al. | 23/314 |
| 3,645,765 | 2/1972 | Frazier et al. | 23/314 |
| 3,691,071 | 9/1972 | Comin | 264/117 |
| 3,865,916 | 2/1975 | Visser et al. | 23/314 |

*Primary Examiner*—Gregory A. Heller
*Attorney, Agent, or Firm*—Wallenstein, Wagner, Hattis, Strampel & Aubel

[57] ABSTRACT

A pelletized carbon black having enhanced dispersion properties is prepared by replacing conventional pelletizing binders with a binder material which is thermally stable at the pellet drying temperature, thermally liquefiable at the mixing temperature of the resulting pellet and its end use matrix, and solid at carbon black storage temperature.

5 Claims, No Drawings

CARBON BLACK PELLETS HAVING ENHANCED DISPERSION PROPERTIES

BACKGROUND OF THE INVENTION

1. Field of the Invention

This invention relates to pelletized carbon black having enhanced dispersion properties.

Carbon black became widely used for reinforcement of rubber in the early 1920's. At that time it was packaged in cartons or drums because it was a light and dusty powder. Shipping and storage were costly due to the low density. Mixing into rubber was difficult.

An improvement in packaging, shipping and storage was obtained with the introduction in the early 1930's of the dry process for pelletizing carbon black. Dry process pelletized carbon black is easier to mix into rubber than powder. However, the pellet is very fragile causing fines and dust problems with the handling of this material.

Wet process pelletized carbon black, introduced in the 1940's, has bulk handling properties superior to dry process carbon black. However, an inherent deficiency exists with all wet process pellets due, in part, to the method itself. In the initial stage of the process the carbon black powder is wetted and densified by agitation in an appropriate apparatus. In the final stage the pellet is coated-out or layered with dry powder that has not been properly densified. As a result, wet process pellets have an exterior that is easily attrited into fines. This causes problems with bulk shipping and with mixing into rubber. Attempts to improve the surface attrition with thermosetting binders, such as molasses, usually produce pellets having interiors that are hard to disperse in soft polymers. All conventional pelletizing processes in commercial use today produce carbon black pellets by bonding aggregates into agglomerates. The bonding mechanism is thought to include both chemical and physical forces. These forces develop when clean surfaces of two aggregates touch. The bonding strength is sufficient to prevent complete deagglomeration by normal rubber mixing methods.

2. The Prior Art

U.S. Pat. No. 3,565,658 describes use of polyethoxylated amines both as a pelletizing agent and a dispersing agent for carbon black.

U.S. Pat. No. 3,282,713 describes an oleaginous pelletizing material for carbon black.

U.S. Pat. No. 4,102,967 describes a pelletizing process using a carbohydrate and a hydrocarbon oil or oil emulsion to produce dust-free carbon black pellets.

Many additional additives and processes have been described in the art, but there has been a continuing need for a carbon black product which is easily produced, stable, non-toxic and easily dispersed in an elastomer. Such a product is provided by the present invention.

SUMMARY OF THE INVENTION

According to the present invention, carbon black is pelletized with a pelletizing additive which also functions as a binder. The additive is stable at pellet drying temperature, is liquid at the mixing temperature of the pellet and its end use matrix, is non-toxic, is solid at pellet storage temperature, and is compatible with the end use matrix. A preferred additive is oxidized polyethylene in the form of a water emulsion.

DESCRIPTION OF THE PREFERRED EMBODIMENTS

The wet pelletizing technique has been used in the carbon black industry for more than forty years. During this time refinements were made to the process which improved the durability of the pellet for bulk handling. Very little attention, however, has been directed toward developing carbon blacks that would mix quicker, with less energy, and would disperse to a finer level when mixed into plastic and elastomeric materials.

This invention provides a new family of carbon blacks produced by a unique pelletizing technique. When mixed into soft matrices, these new carbon blacks disperse faster and with lower power requirements than conventional wet process carbon blacks.

Pelletizing additives in accordance with the invention have several essential properties. They must be compatible with the end use matrix, be thermally liquefiable at the temperature of mixing with the matrix, be solid at pellet storage temperature, be stable at pellet drying temperature, and be non-toxic. Preferred additives are polymeric materials having the properties enumerated above. Preferred additives are substituted or unsubstituted polyalkenes, and a most preferred additive, for use with rubber or polyethylene matrices, is surface-oxidized polyethylene having a molecular weight of from about 1,800 to about 5,000. An example of such material is the product identified as AC 629 oxidized polyethylene, available from Allied Chemical Corp. The additive is most easily handled in the form of a water emulsion. Generally, sufficient emulsion is used to provide from 1 to 10 parts by weight polymer per 100 parts by weight of the dry carbon black pellets. This provides sufficient polymer to provide a thin film of polymer between aggregates of carbon black. The emulsion can be prepared by emulsifying oxidized polyethylene and water with a suitable surfactant. An emulsion containing about 30 percent by weight solid polyethylene can be blended into the pelletizing water, or the emulsion can be added directly, in diluted or let down form is desired, to the pelletizer.

To illustrate the enhanced dispersion properties of carbon blacks according to the invention, several comparisons of these carbon blacks and conventional carbon blacks were made. The following examples show that carbon blacks according to the invention have reduced energy requirements for mixing, less heat buildup during mixing, more complete dispersion as evidenced by light microscopy, and equal or greater tread wear on road tests. These examples also show that carbon blacks according to the invention require less power to mix into plastic compositions, and produce equal or better dispersions in sheet and film products.

To demonstrate the properties of carbon blacks prepared in accordance with the invention, samples were produced in pairs, one of each pair representative of the commercial wet process pelletizing technique, and the other of each pair prepared according to the invention. In each pair, the difference was that an additive containing oxidized low molecular weight polyethylene in water emulsion was added during pelletizing of the non-standard carbon blacks of each pair in an amount sufficient to provide 6 percent by weight polyethylene on the pelletized carbon black, unless a different level of polyethylene is specified. All samples prepared in accordance with the invention are designated by the prefix "ED".

EXAMPLE 1

Treadwear Index Test

In this Example, three commercial wet process carbon blacks were tested against the same carbon blacks prepared in accordance with the invention.

TABLE 1

| Properties of Carbon Blacks Tested for Treadwear Index. | | | |
|---|---|---|---|
| Carbon Black type | N339/ ED-11 | N356/ ED-12 | N299/ ED-8 |
| Iodine adsorption number | 90.0 | 88.0 | 102.0 |
| Nitrogen surface area, × $10^3$ m$^2$/kg | 94.3 | 89.5 | 104.0 |
| Tint strength | 108.7 | 103.0 | 115.7 |
| Dibutyl phthalate abs., dm$^3$/kg | 1.22 | 1.53 | 1.25 |

These six carbon blacks were mixed into passenger tread compounds to evaluate for treadwear index. The formula of the tread compound is listed in Table 2.

TABLE 2

| SBR-BR Tread Formulation | | | |
|---|---|---|---|
| Ingredients | Parts by mass | Ingredients | Parts by mass |
| SBR 1712 | 110.00 | Carbon Black | 65.00 |
| BR (CB-220) | 20.00 | Antioxidants | 1.00 |
| Stearic acid | 1.50 | N—Oxydiethylene benzothiazole-2-sulfenamide | 1.25 |
| Zinc Oxide | 3.00 | | |
| Sulfur | 1.80 | Diphenyl-guanadine | 0.50 |
| | | Total | 204.0 |

The compound vulcanizates were tested in the laboratory and the tires were tested on the roadway. A program established for regular treadwear surveillance was utilized for this experiment. Tires were placed on a test automobile loaded to 80% of the Tire and Rim Association's recommendations, and traversed a prescribed roadway at a velocity of 1.8 m/s for a distance of $9.6 \times 10^6$ m. The treadwear index was obtained by dividing the groove depth loss of the control section by the groove depth loss of the test section and multiplying by 100. Thus, the index is inversely proportional to wear. The severity of the test expressed as the ratio of the distance traveled to the loss in depth of the tread groove is $5.0 \times 10^9$ m/m. Data listed in Table 3 show that treadwear index is equal or higher for the ED samples than for the regular grades. The rubber compound vulcanizate test data for the ED samples show that the values are similar to the regular commercial grades for all properties shown.

TABLE 3

| | Carbon Blacks Tested for Treadwear Index | | | | | |
|---|---|---|---|---|---|---|
| Carbon Black type | N339 | | N356 | | N299 | |
| Sample identification | ED-11 | REG. | ED-12 | REG. | ED-8 | REG. |
| Treadwear index | 101.0 | 100.0 | 100.5 | 91.9 | 103.7 | 102.8 |
| Tensile strength, MPa | 20.8 | 20.9 | 19.2 | 18.5 | 20.5 | 19.9 |
| Ultimate elongation, % | 480 | 460 | 420 | 420 | 420 | 400 |
| Stress @ 300% elong., MPa | 12.1 | 12.7 | 14.1 | 14.3 | 13.5 | 14.0 |
| Hardness, °Shore A | 61 | 64 | 66 | 67 | 66 | 66 |
| Pendulum rebound, % | 48.2 | 48.5 | 49.2 | 49.7 | 46.8 | 47.2 |
| Heat buildup, °C. | 137.2 | 136.6 | 137.7 | 135.5 | 141.6 | 140.0 |

EXAMPLE 2

Mixing to Predetermined Energy Levels

Two experiments were made to study the effects on rubber mixing and vulcanizate properties of ED carbon blacks mixed in an internal batch mixer to predetermined levels of energy consumption. The first experiment used three and the second used two energy levels. All ingredients except sulfur and accelerators were added at zero time for an upside-down mix. To complete the compounds for vulcanization, the sulfur and accelerators were added on a two-roll mill.

A. Solution OE/SBR Tread Compound

This first test was mixed with the formula listed in Table 5, Part A. The compound mixing and vulcanizate test data obtained in this experiment are listed in Table 4.

TABLE 4

| | Carbon Blacks Mixed to Predetermined Energy Levels | | | | | |
|---|---|---|---|---|---|---|
| Carbon Black type | N299 | | | | | |
| Energy consumption. MJ/m$^3$ | 623 | | 1050 | | 1550 | |
| Sample identification | ED-8 | Regular | ED-8 | Regular | ED-8 | Regular |
| Maximum mixing time, s | 112 | 115 | 179 | 180 | 279 | 284 |
| Max. mixing temperature, °C. | 93 | 107 | 118 | 123 | 123 | 123 |
| Mooney - ML 1 + 4 @ 100° C. | 120 | 127 | 70 | 76 | 67 | 68 |
| Hardness, °Shore | 65 | 68 | 67 | 68 | 66 | 67 |
| Tensile strength, MPa | 18.8 | 15.9 | 21.9 | 21.9 | 22.0 | 21.0 |
| Ultimate elongation, % | 460 | 350 | 480 | 470 | 540 | 490 |
| Stress @ 300% elong., MPa | 11.9 | 13.6 | 13.0 | 13.4 | 12.6 | 12.4 |
| Pendulum rebound, % | 47.5 | 46.1 | 45.3 | 45.4 | 45.0 | 45.5 |
| Macro-dispersion rating, % | 95.8 | 85.1 | 99.6 | 99.3 | 99.8 | 99.1 |

Mixing time is shorter for the ED carbon black indicating less time is required per unit of energy. The ED carbon black has both a faster rate of decrease in Mooney viscosity and a faster rate of increase in macro-dispersion rating as the energy consumption is increased. This indicates that the ED carbon blacks mix faster than the regular commercial grade. Another indication that mixing progresses more rapidly with energy level increase is seen with the rate of increase in tensile strength. The slower rate of increase in mixing temperature demonstrates that the ED carbon blacks mix cooler than the commercial counterpart. At the higher energy level, the ED sample has equal mixing temperature indicating that mixing has reached the advanced stage with less heat history.

B. Solution OE/SBR Tire Sidewall Formula

This formula is similar to the formula in the previous section, except for the amount of carbon black being increased from 65 to 75 parts. This formula is listed in Table 5, Part B.

TABLE 5

| Solution OE/SBR Formulas | | | |
|---|---|---|---|
| Ingredients | Parts by mass | Ingredients | Parts by mass |
| OE/SBR (Solution/HS-3) | 137.5 | N—tert-Butyl-benzothiazole-2-sulfenamide | 2.9 |
| Zinc Oxide | 3.0 | | |
| Stearic acid | 2.0 | Carbon Black (Part A) | 65.0 |
| Sulfur | 1.5 | | |
| | | Carbon Black (Part B) | 75.0 |
| | | Total (Part A) | 211.0 |
| | | Total (Part B) | 221.9 |

The data obtained from observing the mixing characteristics and from testing the compound vulcanizates are listed in Table 6.

TABLE 6

| Carbon Blacks Mixed to Predetermined Energy Levels | | | | |
|---|---|---|---|---|
| Carbon Black type | N650 | | | |
| Energy consumption, MJ/m$^3$ | 623 | | 1050 | |
| Sample identification | ED-10 | Regular | ED-10 | Regular |
| Maximum mixing time, s | 114 | 115 | 180 | 188 |
| Max. mixing temperature, °C. | 93 | 99 | 111 | 122 |
| Mooney, ML 1 + 4 @ 100° C. | 123 | 124 | 89 | 76 |
| Tensile strength, MPa | 17.0 | 15.6 | 18.4 | 18.5 |
| Stress @ 300% elong., MPa | 14.6 | 14.7 | 13.9 | 13.7 |
| Pendulum rebound, % | 50.9 | 50.8 | 53.5 | 54.3 |
| Macro-dispersion rating, % | 95.1 | 93.6 | 99.8 | 98.6 |

This test shows a decrease in mixing time and mixing temperature, and an increase in macro-dispersion rating. All are an indication that mixing is cooler and is complete with less time and energy than for the regular samples. Other properties appear to be equivalent to that of the regular blacks.

EXAMPLE 3

EPDM Rubber Goods Mixed to an Energy Profile

This experiment was conducted to determine the optimum mixing characteristics and the compound vulcanizate properties of ED Carbon Blacks in EPDM compounds. Table 7 lists the EPDM formula.

TABLE 7

| EPDM General Rubber Goods Formulation | | | |
|---|---|---|---|
| Ingredients | Parts by Mass | Ingredients | Parts by Mass |
| EPDM (Nordel 1070) | 100.0 | Carbon Black | 130.0 |
| Zinc ditubyldithio-carbamate | 2.0 | Oil | 70.0 |
| | | 2-Mercaptobenzo-thiazole | 1.0 |
| Stearic acid | 1.0 | | |
| Zinc Oxide | 5.0 | Tetramethyl thiuram disulfide | 0.5 |
| Sulfur | 1.5 | | |
| | | Total | 311.0 |

The carbon blacks listed in this experiment were first subjected to an extended mixing cycle to record the integrated energy consumption and the instantaneous power consumption with time. The instantaneous power was obtained with a recording Watt-hour meter. After obtaining the mixing data, these batches are discarded. The energy profile of these mixes was subjectively analyzed and a determination was made of the time required for each mix to progress to completion. New batches were mixed to these predetermined points. The mixing and compound vulcanizate data are listed in Table 8.

TABLE 8

| Properties of ED and Regular Carbon Blacks in EPDM Compounds | | | | |
|---|---|---|---|---|
| Carbon Black type | N650 | | N787 | |
| Sample identification | ED-9 | REG | ED-15 | REG |
| Total mixing time, s | 41.2 | 46.0 | 41.4 | 43.4 |
| Total mixing energy, MJ/m$^3$ | 51.8 | 55.2 | 41.2 | 44.0 |
| Tensile strength, MPa | 12.6 | 13.2 | 12.4 | 12.2 |
| Stress @ 300% elong., % | 8.9 | 9.4 | 6.5 | 6.1 |
| Hardness, °Shore | 62 | 61 | 56 | 58 |
| Mooney, ML 1 + 4 @ 100° C. | 85.6 | 90.9 | 62.9 | 62.9 |
| Pendulum rebound, % | 27.1 | 27.7 | 27.0 | 25.6 |

As indicated by previous tests, the total mixing energy and total mixing time are less for the ED carbon blacks. These vulcanizate physical properties show no clear pattern to indicate differences exist between the ED samples and the regular counterparts. Therefore, the mixing procedure chosen appears to be valid. The emphasis from this experiment is that the ED carbon blacks are sufficiently different from their regular counterparts to merit the establishment of individual mixing profiles to achieve a benefit from the savings in time and energy.

EXAMPLE 4

Mixing ED Carbon Blacks into Polyethylene

This experiment was conducted with ED carbon blacks mixed in low density polyethylene using the formula listed in Table 9. The experimental carbon blacks described in the first three lines of Table 10 formed the basis for this experiment. Mixing was accomplished in an internal batch mixer with a recording Watt-hour meter previously described. All ingredients were placed into the mixing chamber prior to the mix. Time to flux, a designation for the beginning of a churning action of the ram, was observed. The accumulated energy was observed on a digital indicating power integrator and recorded with time.

TABLE 9

| Polyethylene Formulas | | | |
|---|---|---|---|
| 40% Polyethylene Concentrate | | 2% Polyethylene Sheet Film | |
| Ingredients | Parts by mass | Ingredients | Parts by mass |
| PE (low density, melt = 8) | 100.0 | PE (low density, melt = 1) | 100.00 |
| Carbon Black | 66.7 | 40% polyethylene concentrate | 5.26 |
| Total | 166.7 | Total | 105.26 |
| 2% Polyethylene Sheet Film | | | |

Table 10 lists data obtained from the mixing of these carbon blacks in polyethylene concentrate.

TABLE 10

| Carbon Blacks Mixed In Polyethylene Concentrate | | | | | | | |
|---|---|---|---|---|---|---|---|
| Iodine adsorption number | | 90 | | | | 60 | |
| Dibutyl phthalate abs. | | 85 | | | | 85 | |
| Sample identification | EDX-0 | EDX-1 | EDX-2 | EDX-3 | EDY-0 | EDY-1 | EDY-2 |
| Pelletizing additive level, wt. % polyethylene on carbon black | 0 | 2 | 4 | 6 | 0 | 2 | 4 |
| Total energy to flux, MJ/m$^3$ | 710 | 731 | 716 | 657 | 617 | 660 | 626 |
| Total time to flux, s | 39.6 | 36.0 | 33.6 | 30.0 | 37.8 | 36.0 | 33.6 |
| Polyethylene film dispersion rating | 6 | 6 | 6 | 6 | 6 | 6 | 8 |

As seen in Table 10, the mixing energy to flux first increases and then decreases as the additive is increased beyond 4 percent.

Table 10 shows a straight line decrease in mixing time to flux as the additive level is increased.

A laboratory extruder was used to mix a 2% carbon black polyethylene compound. The 40% concentrate was blended with virgin low density polyethylene following the formula listed in Table 9. The resulting extruded and blown film was rated using an arbitrary scale from 1 to 10. Number 1 is the worst and number 10 is the best. There is an indication that the higher ED pelletizing additive level produces a higher polyethylene film dispersion rating.

Data for the ED carbon blacks show reduced energy requirements for mixing, less heat buildup during mixing, more complete dispersions are evidenced by light microscopy and equal or greater resistance to tread wear on road tests. Vulcanizate physical properties of these compounds are similar to the regular commercial carbon blacks. ED carbon blacks require less power to mix into plastic compositions and produce equal or better dispersions in sheet and film products.

The foregoing examples illustrate the benefits from the preferred embodiments described. It will be apparent that modifications and variations could be made, so long as the essential elements of the invention are included.

We claim:

1. A method of making carbon black pellets having enhanced dispersion properties in soft matrices such as rubber and polyethylene matrices, comprising: providing a mixture consisting essentially of finely divided carbon black, water, and a polymeric additive in the form of an oxidized polyethylene, the additive being present in an amount sufficient to provide a thin film thereof between aggregates of the finely divided carbon black; forming the mixture into pellets; and drying the formed pellets.

2. The method of claim 1 wherein said oxidized polyethylene has an average molecular weight of from about 1,800 to about 5,000, and is in a water emulsion.

3. The method of claim 2 wherein the amount of said emulsion used is sufficient to provide from 1 to 10 parts by weight oxidized polyethylene per 100 parts by weight of dry carbon black pellets.

4. A method according to claim 2 wherein a surfactant is incorporated into said emulsion.

5. A method according to claim 1 wherein said polymeric additive is a surface-oxidized polyethylene.

* * * * *